(12) United States Patent
Oh

(10) Patent No.: US 10,377,892 B2
(45) Date of Patent: Aug. 13, 2019

(54) THERMOPLASTIC RESIN COMPOSITION AND MOLDED ARTICLE PRODUCED THEREFROM

(71) Applicant: Lotte Advanced Materials Co., Ltd., Yeosu-si (KR)

(72) Inventor: Hyun Ji Oh, Uiwang-si (KR)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 38 days.

(21) Appl. No.: 15/846,352

(22) Filed: Dec. 19, 2017

(65) Prior Publication Data

US 2018/0186994 A1 Jul. 5, 2018

(30) Foreign Application Priority Data

Dec. 30, 2016 (KR) .................. 10-2016-0184438

(51) Int. Cl.
*C08L 33/12* (2006.01)
*C08L 33/14* (2006.01)
*C08F 220/14* (2006.01)

(52) U.S. Cl.
CPC ............. *C08L 33/12* (2013.01); *C08L 33/14* (2013.01); *C08F 220/14* (2013.01); *C08L 2201/04* (2013.01); *C08L 2201/10* (2013.01); *C08L 2205/02* (2013.01); *C08L 2205/025* (2013.01); *C08L 2205/03* (2013.01)

(58) Field of Classification Search
CPC ........ C08L 33/12; C08L 33/14; C08L 87/005; C08L 2205/025; C08L 2201/04; C08L 2205/03; C08L 2205/02; C08L 2201/10; C08F 220/14; C08F 220/08; C08F 220/44
See application file for complete search history.

(56) References Cited

U.S. PATENT DOCUMENTS

| | | | |
|---|---|---|---|
| 6,277,913 B1* | 8/2001 | Mishima et al. | C08F 255/00 525/170 |
| 8,344,043 B2 | 1/2013 | Jin et al. | |
| 2007/0060716 A1* | 3/2007 | Ambravaneswaran et al. | C08L 69/00 525/464 |
| 2016/0083573 A1 | 3/2016 | Berdin et al. | |
| 2016/0340505 A1 | 11/2016 | Kim et al. | |
| 2017/0198132 A1 | 7/2017 | Yamanoue | |

FOREIGN PATENT DOCUMENTS

| | | |
|---|---|---|
| EP | 3026082 A1 | 6/2016 |
| JP | 08-253640 A | 10/1996 |
| JP | 2005-248054 A | 9/2005 |
| JP | 2011-132528 A | 7/2011 |
| KR | 10-2012-0042802 A | 5/2012 |

OTHER PUBLICATIONS

Extended Search Report in counterpart European Application No. 17208947.6 dated Mar. 1, 2018, pp. 1-5.
Office Action in counterpart Korean Application No. 10-2016-0184438 dated Sep. 6, 2018, pp. 1-6.

* cited by examiner

*Primary Examiner* — Nathan M Nutter
(74) *Attorney, Agent, or Firm* — Additon, Higgins & Pendleton, P.A.

(57) ABSTRACT

A thermoplastic resin composition includes: about 100 parts by weight of a base resin including about 14 wt % to about 25 wt % of (A) a (meth)acrylate-aromatic vinyl-vinyl cyanide copolymer and about 75 wt % to about 86 wt % of (B) a (meth)acrylate resin; and about 25 parts by weight to about 35 parts by weight of (C) an antistatic resin including at least one of a polyether-ester amide block copolymer, a poly(alkylene) glycol and a polyamide, relative to about 100 parts by weight of the base resin.

11 Claims, No Drawings

THERMOPLASTIC RESIN COMPOSITION AND MOLDED ARTICLE PRODUCED THEREFROM

CROSS-REFERENCE TO RELATED APPLICATION

This application claims priority under 35 USC Section 119 to and the benefit of Korean Patent Application 10-2016-0184438, filed on Dec. 30, 2016, the entire disclosure of which is incorporated herein by reference.

FIELD

The present invention relates to a thermoplastic resin composition and a molded article produced therefrom.

BACKGROUND

Thermoplastic resins have good properties in terms of mechanical properties, processability, appearance and the like, and thus are widely used for interior/exterior materials of electric/electronic products, interior/exterior materials for automobiles, exterior materials for building, and the like.

Recently, there is an increasing market trend of using transparent or translucent materials in products such as household appliances, medical devices, toys and the like, and demand for high impact properties and high flowability increases with increasing level of difficulty in design.

Typically, it is known to use an impact modifier such as a silicone compound for reinforcement of impact resistance of a thermoplastic resin. However, a thermoplastic resin composition including an impact modifier can exhibit low flowability or can suffer from whitening on a product when left at low temperature.

Moreover, since a thermoplastic resin including an excess of an impact modifier is likely to suffer from generation of scratches and has high haze and low total light transmittance, it is difficult to use such a thermoplastic resin in products requiring transparency.

Therefore, there is increasing demand for a thermoplastic resin composition, which has good surface resistance properties, antibacterial properties and the like while securing high transparency and impact resistance and thus can be applied to various products such as household appliances, office automation equipment, medical devices, toys, and the like.

SUMMARY OF THE INVENTION

Embodiments provide a thermoplastic resin composition that can have good transparency, antistatic properties, impact resistance and/or antibacterial properties (activity), and a molded article produced therefrom.

The thermoplastic resin composition includes: about 100 parts by weight of a base resin including about 14% by weight (wt %) to about 25 wt % of (A) a (meth)acrylate-aromatic vinyl-vinyl cyanide copolymer and about 75 wt % to about 86 wt % of (B) a (meth)acrylate resin; and about 25 parts by weight to about 35 parts by weight of (C) an antistatic resin including at least one of a polyether-ester amide block copolymer, a poly(alkylene) glycol and a polyamide, relative to about 100 parts by weight of the base resin.

A weight ratio of the (A) (meth)acrylate-aromatic vinyl-vinyl cyanide copolymer to the (B) (meth)acrylate resin in the base resin may range from about 1:3 to about 1:6.

The (A) (meth)acrylate-aromatic vinyl-vinyl cyanide copolymer may be a copolymer of a mixture including about 20 wt % to about 40 wt % of an aromatic vinyl monomer and a vinyl cyanide monomer and about 60 wt % to about 80 wt % of a (meth)acrylate monomer.

The (C) antistatic resin may include a polyether-ester amide block copolymer.

The polyether-ester amide block copolymer may include about 10 wt % to about 95 wt % of a polyether-ester block.

The base resin may have an index of refraction of about 1.25 to about 1.75.

In the thermoplastic resin composition, a difference in index of refraction between the base resin and the antistatic resin may be about 0.3 or less, as represented by Equation 1:

$$\text{Difference in index of refraction} = |(R1-R2)| \quad \text{[Equation 1]}$$

where R1 is an index of refraction of the base resin and R2 is an index of refraction of the antistatic resin.

The thermoplastic resin composition may have an antibacterial activity of about 2.0 to about 7.0 against *Staphylococcus* and an antibacterial activity of about 1.0 to about 7.5 against *Escherichia coli*, as calculated by Equation 2 after a 5 cm×5 cm specimen is inoculated with *Staphylococcus* and *Escherichia coli* in accordance with JIS Z 2801 for antibacterial evaluation:

$$\text{Antibacterial activity} = \log(M1/M2) \quad \text{[Equation 2]}$$

where M1 is the number of bacteria measured on a blank specimen after culturing at 35° C. and 90% RH for 24 hours and M2 is the number of bacteria measured on the specimen of the thermoplastic resin composition after culturing at 35° C. and 90% RH for 24 hours.

The thermoplastic resin composition may have a haze of about 10% or less and a total light transmittance of about 80% or more, as measured on a 2.5 mm thick specimen in accordance with ASTM D1003.

The thermoplastic resin composition may have a surface resistance of about $10 \times 10^8 \Omega/\square$ or less, as measured on a 2.5 mm thick specimen at 23° C. and 50% RH in accordance with ASTM D250.

The thermoplastic resin composition may satisfy Equation 3:

$$1000 \text{ mm} \leq Id \quad \text{[Equation 3]}$$

where Id is a drop height measured on a 2 mm thick injection-molded specimen using a 1 kg metallic weight according to the DuPont drop test method.

Another embodiment relates to a molded article produced from the thermoplastic resin composition set forth above.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

One embodiment of the present invention relates to a thermoplastic resin composition, which includes: about 100 parts by weight of a base resin including about 14 wt % to about 25 wt % of (A) a (meth)acrylate-aromatic vinyl-vinyl cyanide copolymer and about 75 wt % to about 86 wt % of (B) a (meth)acrylate resin; and about 25 parts by weight to about 35 parts by weight of (C) an antistatic resin including at least one of a polyether-ester amide block copolymer, a poly(alkylene) glycol and a polyamide, relative to about 100 parts by weight of the base resin.

The present invention provides a thermoplastic resin composition that can have good transparency, antistatic properties, impact resistance and/or antibacterial properties. For example, the thermoplastic resin composition can exhibit good property balance between transparency, antistatic properties, impact resistance and antibacterial properties, and thus can be more usefully industrially used when applied to products, such as household appliances, housings of office automation equipment, toys, and the like.

As used herein, unless otherwise defined, the term "substituted" means that a hydrogen atom in a functional group is substituted with one or more of a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, and/or a $C_1$ to $C_{20}$ alkoxy group. Also as used herein, unless otherwise defined, the term "hetero" refers to one or more of a S, N, O, and/or P atom in place of a carbon atom.

(A) (Meth)Acrylate-Aromatic Vinyl-Vinyl Cyanide Copolymer

According to embodiments of the present invention, the (meth)acrylate-aromatic vinyl-vinyl cyanide copolymer is obtained by copolymerization of a vinyl cyanide monomer, an aromatic vinyl monomer and a (meth)acrylate monomer, and can improve flowability, thermal stability and/or compatibility of the thermoplastic resin composition while realizing transparency and/or impact resistance thereof.

The (meth)acrylate-aromatic vinyl-vinyl cyanide copolymer may be a non-rubbery copolymer not including a rubber polymer.

In one embodiment, the (meth)acrylate-aromatic vinyl-vinyl cyanide copolymer may be prepared by a general process of polymerizing a mixture of the vinyl cyanide monomer, the aromatic vinyl monomer and the (meth)acrylate monomer in conjunction with a polymerization initiator.

The initiator may be a radical polymerization initiator, without being limited thereto. Examples of the initiator may include, for example, peroxides, persulfates, azo cyanide compounds, and/or redox initiators, without being limited thereto. In addition, polymerization of the copolymer may be performed by a polymerization method known in the art, such as emulsion polymerization, suspension polymerization, bulk polymerization, and the like.

In one embodiment, the vinyl cyanide monomer may include at least one of acrylonitrile, methacrylonitrile, ethacrylonitrile, phenyl acrylonitrile, α-chloroacrylonitrile, and fumaronitrile, without being limited thereto. These vinyl cyanide monomers may be used alone or in combination thereof.

In one embodiment, the vinyl cyanide monomer may be present in an amount of about 1 wt % to about 50 wt %, for example, about 5 wt % to about 45 wt %, and as another example about 10 wt % to about 30 wt %, based on the total weight (100 wt %) of the (meth)acrylate-aromatic vinyl-vinyl cyanide copolymer. In some embodiments, the (meth)acrylate-aromatic vinyl-vinyl cyanide copolymer may include the vinyl cyanide monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the vinyl cyanide monomer can be in a range from about any of the foregoing amounts to about any other of the foregoing amounts. Within this range, the thermoplastic resin composition can have good properties in terms of flowability, impact resistance, appearance, and the like.

In one embodiment, the aromatic vinyl monomer may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinylnaphthalene, without being limited thereto. These aromatic vinyl monomers may be used alone or in combination thereof.

In one embodiment, the aromatic vinyl monomer may be present in an amount of about 1 wt % to about 50 wt %, for example, about 5 wt % to about 45 wt %, and as another example about 10 wt % to about 30 wt %, based on the total weight (100 wt %) of the (meth)acrylate-aromatic vinyl-vinyl cyanide copolymer. In some embodiments, the (meth)acrylate-aromatic vinyl-vinyl cyanide copolymer may include the aromatic vinyl monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the aromatic vinyl monomer can be in a range from about any of the foregoing amounts to about any other of the foregoing amounts. Within this range, the thermoplastic resin composition can have further improved properties in terms of heat resistance, impact resistance, and the like.

In one embodiment, the (meth)acrylate monomer may include substituted or unsubstituted acrylic acids, methacrylic acids, alkyl esters thereof, and the like. These (meth)acrylate monomers may be used alone or in combination thereof.

In one embodiment, the (meth)acrylate monomer may include at least one of substituted or unsubstituted $C_1$ to $C_{20}$ linear or branched alkyl (meth)acrylic acid esters, for example, methyl (meth)acrylate, ethyl (meth)acrylate, propyl (meth)acrylate, butyl (meth)acrylate, pentyl (meth)acrylate, hexyl (meth)acrylate, heptyl (meth)acrylate, ethylhexyl (meth)acrylate, octyl (meth)acrylate, nonyl (meth)acrylate, decyl (meth)acrylate, and esters thereof, without being limited thereto. These (meth)acrylate monomers may be used alone or in combination thereof.

In one embodiment, the (meth)acrylate monomer may be present in an amount of about 10 wt % to about 90 wt %, for example, about 40 wt % to about 80 wt %, and as another example about 60 wt % to about 80 wt %, based on the total weight (100 wt %) of the (meth)acrylate-aromatic vinyl-vinyl cyanide copolymer. In some embodiments, the (meth)acrylate-aromatic vinyl-vinyl cyanide copolymer may include the (meth)acrylate monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the (meth)acrylate monomer can be in a range from about any of the foregoing amounts to about any other of the foregoing amounts. Within this range, the thermoplastic resin composition can have further improved properties in terms of impact resistance, flowability, appearance, and the like.

In one embodiment, the (meth)acrylate-aromatic vinyl-vinyl cyanide copolymer may be a copolymer of a mixture including about 20 wt % to about 40 wt % of the aromatic vinyl monomer and the vinyl cyanide monomer and about 60 wt % to about 80 wt % of the (meth)acrylate monomer. Within this range, the thermoplastic resin composition can have further improved properties in terms of impact resistance, flowability, appearance, and the like.

In some embodiments, the (meth)acrylate-aromatic vinyl-vinyl cyanide copolymer may include a mixture of the aromatic vinyl monomer and the vinyl cyanide monomer in an amount of about 20, 21, 22, 23, 24, 25, 26, 27, 28, 29, 30, 31, 32, 33, 34, 35, 36, 37, 38, 39, or 40 wt %. Further, according to some embodiments, the amount of the mixture of the aromatic vinyl monomer and the vinyl cyanide monomer can be in a range from about any of the foregoing amounts to about any other of the foregoing amounts.

In some embodiments, the (meth)acrylate-aromatic vinyl-vinyl cyanide copolymer may include the (meth)acrylate monomer in an amount of about 60, 61, 62, 63, 64, 65, 66, 67, 68, 69, 70, 71, 72, 73, 74, 75, 76, 77, 78, 79, or 80 wt %. Further, according to some embodiments, the amount of the (meth)acrylate monomer can be in a range from about any of the foregoing amounts to about any other of the foregoing amounts.

In one embodiment, the (meth)acrylate-aromatic vinyl-vinyl cyanide copolymer may have a weight average molecular weight of about 30,000 g/mol to about 200,000 g/mol, for example about 35,000 g/mol to about 150,000 g/mol, and as another example about 40,000 g/mol to about 110,000 g/mol. Within this range, the thermoplastic resin composition can have further improved properties in terms of thermal stability, heat resistance, and/or flowability.

The (meth)acrylate-aromatic vinyl-vinyl cyanide copolymer is present in an amount of about 14 wt % to about 25 wt % based on 100 wt % of the base resin. In some embodiments, the base resin may include the (meth)acrylate-aromatic vinyl-vinyl cyanide copolymer in an amount of about 14, 15, 16, 17, 18, 19, 20, 21, 22, 23, 24, or 25 wt %. Further, according to some embodiments, the amount of the (meth)acrylate-aromatic vinyl-vinyl cyanide copolymer can be in a range from about any of the foregoing amounts to about any other of the foregoing amounts. If the amount of the (meth)acrylate-aromatic vinyl-vinyl cyanide copolymer is less than about 14 wt %, it can be difficult to realize thermal stability, impact resistance and the like, and if the amount of the (meth)acrylate-aromatic vinyl-vinyl cyanide copolymer is greater than about 25 wt %, it can be difficult to realize transparency of the thermoplastic resin composition and antistatic properties thereof can be insufficient.

In one embodiment, the (meth)acrylate-aromatic vinyl-vinyl cyanide copolymer may be present in an amount of about 14 wt % to about 20 wt %, for example about 15 wt % to about 19 wt %. Within this range, the thermoplastic resin composition can have further improved properties in terms of impact resistance, transparency, antistatic properties, and the like.

(B) (Meth)Acrylate Resin

The (meth)acrylate resin (which is not the same as the (meth)acrylate-aromatic vinyl-vinyl cyanide copolymer) is a polymer of a (meth)acrylate monomer and may include a homopolymer of one (meth)acrylate monomer and/or a copolymer including two or more (meth)acrylate monomers as polymerization units. With these components, the thermoplastic resin can realize good transparency and/or improved properties such as impact resistance and the like.

In one embodiment, the (meth)acrylate monomer may include at least one of substituted or unsubstituted $C_1$ to $C_{20}$ linear or branched alkyl (meth)acrylic acid esters, for example, methyl (meth)acrylate, ethyl (meth)acrylate, propyl (meth)acrylate, butyl (meth)acrylate, pentyl (meth)acrylate, hexyl (meth)acrylate, heptyl (meth)acrylate, ethylhexyl (meth)acrylate, octyl (meth)acrylate, nonyl (meth)acrylate, decyl (meth)acrylate, and esters thereof, without being limited thereto. These (meth)acrylate monomers may be used alone or in combination thereof.

In one embodiment, the (meth)acrylate monomer may include methyl methacrylate and/or methyl acrylate, and the like. In this embodiment, the (meth)acrylate monomer acts in combination with the (meth)acrylate-aromatic vinyl-vinyl cyanide copolymer set forth above, whereby transparency and impact resistance of the base resin can be further improved while allowing adjustment of the index of refraction thereof. The (meth)acrylate resin may be present in an amount of about 75 wt % to about 86 wt % based on 100 wt % of the base resin. In some embodiments, the base resin may include the (meth)acrylate resin in an amount of about 75, 76, 77, 78, 79, 80, 81, 82, 83, 84, 85, or 86 wt %. Further, according to some embodiments, the amount of the (meth)acrylate resin can be in a range from about any of the foregoing amounts to about any other of the foregoing amounts. If the amount of the (meth)acrylate resin is less than about 75 wt %, the thermoplastic resin composition can have low total light transmittance due to high haze and thus is unlikely to realize a transparent appearance, and if the amount of the (meth)acrylate resin is greater than about 86 wt %, the thermoplastic resin composition can have insufficient antistatic properties due to high surface resistance and thus is unlikely to realize good impact resistance.

In one embodiment, the (meth)acrylate resin may be present in an amount of about 78 wt % to about 85 wt %, for example about 80 wt % to about 85 wt % in the base resin. Within this range, the thermoplastic resin composition can have better impact resistance, transparency, antistatic properties, and the like.

(C) Antistatic Resin

The antistatic resin may improve antibacterial properties, antistatic properties and the like of the thermoplastic resin composition (or a specimen produced therefrom), and may include at least one of a polyether-ester amide block copolymer, a poly(alkylene) glycol, and a polyamide.

In one embodiment, the (C) antistatic resin may include a polyether-ester amide block copolymer. In this embodiment, the thermoplastic resin composition can have further improved antibacterial properties and antistatic properties and also can have improved compatibility with the base resin set forth above. The polyether-ester amide block copolymer may be a copolymer including a polyamide block, a polyester block, and an ether unit.

In one embodiment, the polyether-ester amide block copolymer may include a polyether-ester amide having a bisphenol skeleton such as bisphenol A, for example, a polyether-ester amide formed by bonding a polyamide having carboxyl groups at both ends thereof to a polyethylene oxide via bisphenol A glycidyl ether, or the like.

In one embodiment, the polyether-ester amide block copolymer may be a block copolymer of a reaction mixture including: a $C_6$ or more aminocarboxylic acid, lactam and/or diamine-dicarboxylic acid salt; a poly(alkylene) glycol; and a $C_4$ to $C_{20}$ dicarboxylic acid.

Examples of the $C_6$ or more aminocarboxylic acid, lactam and/or diamine-dicarboxylic acid salt may include without limitation: aminocarboxylic acids such as ω-aminocaproic acid, ω-aminoenanthic acid, ω-aminocaprylic acid, ω-aminopelargonic acid, ω-aminocapric acid, 1,1-aminoundecanoic acid, and 1,2-aminododecanoic acid; lactams such as caprolactam, enanthic lactam, caprylic lactam, and lauryl lactam; and salts of diamine and dicarboxylic acid such as hexamethylenediamine-adipic acid salt and hexamethylenediamine-isophthalic acid salt; and the like, and mixtures thereof. For example, the $C_6$ or more aminocarboxylic acid, lactam and/or diamine-dicarboxylic acid salt may be 1,2-aminododecanoic acid, caprolactam, and/or hexamethylene-diamine-adipic acid salt.

Examples of the poly(alkylene) glycol may include without limitation polyethylene glycol, poly(1,2-propylene) glycol, poly(1,3-propylene) glycol, polytetramethylene glycol, polyhexamethylene glycol, a block and/or random copolymer of ethylene glycol and propylene glycol, and/or a copolymer of ethylene glycol and tetrahydrofuran. For example, the poly(alkylene) glycol may be polyethylene glycol and/or a copolymer of ethylene glycol and propylene glycol.

Examples of the $C_4$ to $C_{20}$ dicarboxylic acid may include without limitation terephthalic acid, 1,4-cyclohexarboxylic acid, sebacic acid, adipic acid, dodecane carboxylic acid, and the like, and combinations thereof.

In one embodiment, a bond between the $C_6$ or more aminocarboxylic acid, lactam and/or diamine-dicarboxylic acid salt and the poly(alkylene) glycol may be an ester bond; a bond between the $C_6$ or more aminocarboxylic acid, lactam and/or diamine-dicarboxylic acid salt and the $C_4$ to $C_{20}$ dicarboxylic acid may be an amide bond; and a bond between the poly(alkylene) glycol and the $C_4$ to $C_{20}$ dicarboxylic acid may be an ester bond.

In one embodiment, the polyether-ester amide block copolymer may include about 10 wt % to about 95 wt %, for example about 15 wt % to about 90 wt %, and as another example about 20 wt % to about 85 wt % of the polyether-ester block. In some embodiments, the polyether-ester amide block copolymer may include the polyether-ester block in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the polyether-ester block can be in a range from about any of the foregoing amounts to about any other of the foregoing amounts. Within this range, the thermoplastic resin composition can have further improved properties in terms of mechanical properties, antibacterial properties, antistatic properties, and the like.

In one embodiment, the antistatic resin is present in an amount of about 25 parts by weight to about 35 parts by weight relative to about 100 parts by weight of the base resin. In some embodiments, the base resin may include the antistatic resin in an amount of about 25, 26, 27, 28, 29, 30, 31, 32, 33, 34, or 35 parts by weight. Further, according to some embodiments, the amount of the antistatic resin can be in a range from about any of the foregoing amounts to about any other of the foregoing amounts. If the amount of the antistatic resin is less than about 25 parts by weight, there is a concern that the thermoplastic resin composition can have poor antibacterial properties and/or antistatic properties, and if the amount of the antistatic resin is greater than about 35 parts by weight, the thermoplastic resin composition can exhibit insufficient impact resistance, and can have high haze and/or low total light transmittance, thereby providing a poor appearance.

In one embodiment, the antistatic resin may be present in an amount of about 27 parts by weight to about 33 parts by weight, for example about 28 parts by weight to about 32 parts by weight, relative to about 100 parts by weight of the base resin. Within this range, the thermoplastic resin composition can have further improved properties in terms of impact resistance, transparency, antistatic properties, and the like.

(D) Additives

The thermoplastic resin composition may further include one or more of typical additive(s) included in thermoplastic resin compositions. Examples of the additives may include flame retardants, fillers, antioxidants, anti-dripping agents, lubricants, release agents, nucleating agents, stabilizers, pigments, dyes, and combinations thereof, without being limited thereto. The additives may be present in an amount of about 0.001 parts by weight to about 40 parts by weight, for example, about 0.1 parts by weight to about 10 parts by weight, relative to about 100 parts by weight of the thermoplastic resin composition.

In the thermoplastic resin composition according to the present invention, a weight ratio of the (A) (meth)acrylate-aromatic vinyl-vinyl cyanide copolymer to the (B) (meth)acrylate resin may range from about 1:3 to about 1:6, for example from about 1:3 to about 1:5. In some embodiments, the weight ratio of the (A) (meth)acrylate-aromatic vinyl-vinyl cyanide copolymer to the (B) (meth)acrylate resin may be 1:3, 1:4, 1:5, or 1:6. Within this range, the thermoplastic resin composition can have a good balance between transparency, antistatic properties, impact resistance, and/or antibacterial properties.

A difference in index of refraction between the base resin and the antistatic resin can be reduced due to combined action of the (A) (meth)acrylate-aromatic vinyl-vinyl cyanide copolymer and the (B) (meth)acrylate resin, whereby the thermoplastic resin composition according to the present invention can exhibit low haze and further improved total light transmittance, and thus can have better appearance properties.

The base resin may have an index of refraction of about 1.25 to about 1.75, for example about 1.45 to about 1.55. Within this range, the thermoplastic resin composition can exhibit good optical properties such as high transparency, high total light transmittance, and/or low haze.

In the thermoplastic resin composition according to the present invention, the difference in index of refraction between the base resin and the antistatic resin may be about 0.3 or less, for example about 0.2 or less, and as another example about 0.15 or less, as represented by Equation 1:

Difference in index of refraction=|(R1−R2)|   [Equation 1]

where R1 is an index of refraction of the base resin and R2 is an index of refraction of the antistatic resin. Thus, the thermoplastic resin composition can exhibit further improved transparency and also can have better effects in reduction of haze and/or colorability when including a high amount of the antistatic resin.

The thermoplastic resin composition may be prepared in pellet or powder form by mixing the components set forth above, followed by melt extrusion at about 200° C. to about 280° C., for example, about 220° C. to about 250° C., using a general twin-screw extruder.

The thermoplastic resin composition according to the present invention has an antibacterial effect against various bacteria including *Staphylococcus, Escherichia coli*, and the like.

In one embodiment, the thermoplastic resin composition may have an antibacterial activity of about 2.0 to about 7.0 against *Staphylococcus* and an antibacterial activity of about 1.0 to about 7.5 against *Escherichia coli*, as calculated by Equation 2 after a 5 cm×5 cm specimen is inoculated with *Staphylococcus* and *Escherichia coli*, in accordance with JIS Z 2801 for antibacterial evaluation:

Antibacterial activity=log($M1/M2$)  [Equation 2]

where M1 is the number of bacteria measured on a blank specimen after culturing at 35° C. and 90% relative humidity (RH) for 24 hours and M2 is the number of bacteria measured on the specimen of the thermoplastic resin composition after culturing at 35° C. and 90% RH for 24 hours. Thus, the thermoplastic resin composition can have good antibacterial properties and thus can have advantageous properties for use in products, such as household appliances, toys, and the like.

In one embodiment, the thermoplastic resin composition may have a haze of about 10% or less and a total light transmittance of about 80% or more, as measured on a 2.5 mm thick specimen in accordance with ASTM D1003. Thus, the thermoplastic resin composition can have good transparency, and thus can have advantageous properties for use in household appliances, toys, and various products requiring transparency.

In one embodiment, the thermoplastic resin composition may have a surface resistance of about $10 \times 10^8 \Omega/\square$ or less, as measured on a 2.5 mm thick specimen at 23° C. and 50% RH in accordance with ASTM D250. Thus, the thermoplastic resin composition can have good antistatic properties and voltage properties, and thus can have advantageous properties for use in household appliances, office automation equipment, toys, and various products requiring good electrical properties.

In one embodiment, the thermoplastic resin composition may satisfy Equation 3:

1000 mm≤$Id$  [Equation 3]

where Id is a drop height measured on a 2 mm thick molded article specimen using a 1 kg metallic weight according to the DuPont drop test method. Thus, the thermoplastic resin composition can have good impact resistance and thus can have advantageous properties for use in various products requiring impact resistance.

Another embodiment relates to a molded article produced from the thermoplastic resin composition set forth above. The antibacterial thermoplastic resin composition may be prepared in pellet form, and the prepared pellets may be manufactured into various molded articles (products) by various molding methods such as injection molding, extrusion, vacuum molding, casting, and the like. These molding methods are well known by one of ordinary skill in the art.

The molded article produced from the thermoplastic resin composition according to the present invention can have good transparency, antistatic properties, impact resistance, and/or antibacterial properties, and a molded article made from the same can be used in the production of various products, including without limitation household appliances, housings of office automation equipment, toys, and the like.

EXAMPLE

Next, the present invention will be described in more detail with reference to the following examples. However, it should be understood that these examples are provided for illustration only and are not to be construed in any way as limiting the present invention.

(A) (Meth)Acrylate-Aromatic Vinyl-Vinyl Cyanide Copolymer (a1) 73.85 wt % of methyl methacrylate, 5 wt % of acrylonitrile, and 21.15 wt % of styrene are introduced into a reactor, followed by performing suspension polymerization, and then dehydrated and dried, whereby a methyl methacrylate-styrene-acrylonitrile copolymer having a molecular weight of about 105,000 g/mol is prepared in the form of beads and used.

(B) (Meth)Acrylate Resin

A polymethylmethacrylate resin (model: TF-9, Lotte MRC Co., Ltd.) is used.

(C) Antistatic Resin

An antistatic resin (model: PELECTRON AS, Sanyo Co., Ltd.) including a polyether-ester amide block copolymer is used.

Example 1 and Comparative Examples 1 to 4:
Preparation of Thermoplastic Resin Composition The components set forth above are introduced into a reactor in amounts as listed in Table 1, followed by performing extrusion at 230° C., thereby preparing pellets. Extrusion is performed using a twin-screw extruder having L/D=36 and a diameter of 45 mm and the prepared pellets are dried at 80° C. for 4 or more hours, followed by injection molding in a 6 oz. injection molding machine (molding temperature: 250° C., mold temperature: 60° C.), thereby manufacturing a specimen. The manufactured specimen is evaluated as to the following properties. Results are shown in Table 2.

TABLE 1

| Component | Example 1 | Comparative Example 1 | Comparative Example 2 | Comparative Example 3 | Comparative Example 4 |
|---|---|---|---|---|---|
| (A) | 17 | 56 | 56 | 43 | 30 |
| (B) | 83 | 44 | 44 | 57 | 70 |
| (C) | 30 | — | 30 | 30 | 30 |

In Table 1, (A) and (B) are given in units of wt % based on the total sum (100%) of (A)+(B), and (C) is given in unit of parts by weight relative to 100 parts by weight of the sum total of (A)+(B).

Evaluation of Properties (1) Haze (%) and Total light transmittance (%): Haze and total light transmittance are measured on a 2.5 mm thick injection-molded specimen using a haze meter in accordance with ASTM D1003.

(2) Surface resistance ($\Omega/\square$): Surface resistance is measured on a 2.5 mm thick injection-molded specimen at 23° C. and 50% RH in accordance with ASTM D250.

(3) Antibacterial activity: Antibacterial activity is calculated by Equation 2 after a 5 cm×5 cm specimen is inoculated with *Staphylococcus* and *Escherichia coli*, in accordance with JIS Z 2801 for antibacterial evaluation.

Antibacterial activity=log($M1/M2$)  [Equation 2]

where M1 is the number of bacteria measured on a blank specimen after culturing at 35° C. and 90% RH for 24 hours and M2 is the number of bacteria measured on the specimen of the thermoplastic resin composition after culturing at 35° C. and 90% RH for 24 hours.

(4) DuPont drop test: According to the DuPont drop test, each of a 0.5 kg rubbery weight and a 1 kg metallic weight is dropped 20 times onto a 2 mm thick injection-molded specimen from a height of 1000 mm, followed by observing whether cracks are generated on the specimen. When the specimen did not suffer from cracks and thus passed the DuPont drop test, the specimen is rated as O, and when the specimen suffers from cracks and thus did not pass the DuPont drop test, the specimen is rated as X.

(5) Appearance properties: When a specimen has a haze of 10% or less and a total light transmittance of 80% or more and thus has good appearance properties, the specimen is rated as O, and when a specimen has a haze of greater than 10% and a total light transmittance of less than 80% and thus has insufficient appearance properties, the specimen is rated as X.

(6) Electrical properties: When a specimen has a surface resistance of $10 \times 10^8 \Omega/\square$ or less and thus has electrical properties suitable to be used for purposes such as household appliances and the like, the specimen is rated as O, and when a specimen has a surface resistance of greater than $10 \times 10^8 \Omega/\square$ and thus has electrical properties unsuitable for the purposes set forth above, the specimen is rated as X.

(7) Impact resistance: According to the DuPont drop test, a 1 kg metallic weight is dropped 20 times onto a 2 mm thick injection-molded specimen from a height of 1,000 mm, followed by measuring an average drop height. Next, whether the specimen satisfied Equation 3 is checked, thereby evaluating impact resistance. The specimen is rated as O when satisfying Equation 3 and rated as X when not satisfying Equation 3:

$$1000 \text{ mm} \leq Id \qquad \text{[Equation 3]}$$

where Id is a drop height measured on the 2 mm thick injection-molded specimen using the 1 kg metallic weight according to the DuPont drop test.

TABLE 2

|  | Example 1 | Comparative Example 1 | Comparative Example 2 | Comparative Example 3 | Comparative Example 4 |
|---|---|---|---|---|---|
| Total light transmittance (%) | 83.84 | 92 | 80.58 | 81.25 | 83.56 |
| Haze (%) | 6.26 | 0.5 | 26.8 | 27.5 | 11.23 |
| Surface resistance ($\Omega/\square$) | $2 \times 10^8$ | $2 \times 10^{16}$ | $1.2 \times 10^9$ | $8 \times 10^8$ | $2 \times 10^8$ |
| Antibacterial properties (*Staphylococcus*) | 4.6 | 0 | 4.6 | 4.6 | 4.6 |
| Antibacterial properties (*Escherichia coli*) | 3.0 | 0 | 3.0 | 3.0 | 3.0 |
| DuPont drop test (Rubber, 0.5 kg) | O | X | O | O | O |
| DuPont drop test (Metal, 1 kg) | O | X | O | O | O |
| Appearance properties | O | O | X | X | X |
| Electrical suitability | O | X | X | O | O |
| Impact resistance | O | X | O | O | O |

From the results of Table 2, it can be seen that the thermoplastic resin composition of Example 1 exhibits good transparency, antistatic properties, impact resistance and antibacterial properties and has a good balance therebetween. The thermoplastic resin composition of Example 1 includes 100 parts by weight of the base resin including 14 wt % to 25 wt % of the (A) (meth)acrylate-aromatic vinyl-vinyl cyanide copolymer and 75 wt % to 86 wt % of the (B) (meth)acrylate resin; and 25 parts by weight to 35 parts by weight of the (C) antistatic resin including at least one of a polyether-ester amide block copolymer, a poly(alkylene) glycol and a polyamide, relative to 100 parts by weight of the base resin.

On the other hand, it can be seen that, since the thermoplastic resin compositions of Comparative Examples 1 to 4, which include an excess of the (A) (meth)acrylate-aromatic vinyl-vinyl cyanide copolymer and include an insufficient amount of the (B) (meth)acrylate resin, have negative compatibility between the base resin and the antistatic resin, it is difficult to realize good electrical suitability, impact resistance, and/or appearance properties. In addition, the thermoplastic resin composition of Comparative Example 1 does not include the antistatic resin and has extremely high surface resistance, suffers from cracking and could not exhibit antibacterial properties, and thus the thermoplastic resin composition of Comparative Example 1 is not suitable in terms of all of electrical properties, impact resistance, and antibacterial properties.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A thermoplastic resin composition comprising:

about 100 parts by weight of a base resin comprising about 14 wt % to about 25 wt % of (A) a (meth)acrylate-aromatic vinyl-vinyl cyanide copolymer and about 75 wt % to about 86 wt % of (B) a (meth)acrylate resin; and about 25 parts by weight to about 35 parts by weight of (C) an antistatic resin comprising at least one of a polyether-ester amide block copolymer, a poly(alkylene) glycol and a polyamide, relative to about 100 parts by weight of the base resin.

2. The thermoplastic resin composition according to claim 1, wherein a weight ratio of the (A) (meth)acrylate-aromatic vinyl-vinyl cyanide copolymer to the (B) (meth)acrylate resin in the base resin ranges from about 1:3 to about 1:6.

3. The thermoplastic resin composition according to claim 1, wherein the (A) (meth)acrylate-aromatic vinyl-vinyl cyanide copolymer is a copolymer of a mixture comprising about 20 wt % to about 40 wt % of an aromatic vinyl monomer and a vinyl cyanide monomer and about 60 wt % to about 80 wt % of a (meth)acrylate monomer.

4. The thermoplastic resin composition according to claim 1, wherein the (C) antistatic resin comprises a polyether-ester amide block copolymer, the polyether-ester amide block copolymer comprising about 10 wt % to about 95 wt % of a polyether-ester block.

5. The thermoplastic resin composition according to claim 1, wherein the base resin has an index of refraction of about 1.25 to about 1.75.

6. The thermoplastic resin composition according to claim 1, wherein a difference in index of refraction between the base resin and the antistatic resin is about 0.3 or less, as represented by Equation 1:

Difference in index of refraction=$|(R1-R2)|$     [Equation 1]

where R1 is an index of refraction of the base resin and R2 is an index of refraction of the antistatic resin.

7. The thermoplastic resin composition according to claim 1, wherein the thermoplastic resin composition has an antibacterial activity of about 2.0 to about 7.0 against *Staphylococcus* and an antibacterial activity of about 1.0 to about 7.5 against *Escherichia coli*, as calculated by Equation 2 after a 5 cm×5 cm specimen is inoculated with *Staphylococcus* and *Escherichia coli*, in accordance with JIS Z 2801 for antibacterial evaluation:

Antibacterial activity=$\log(M1/M2)$     [Equation 2]

where M1 is the number of bacteria measured on a blank specimen after culturing at 35° C. and 90% RH for 24 hours and M2 is the number of bacteria measured on the specimen of the thermoplastic resin composition after culturing at 35° C. and 90% RH for 24 hours.

8. The thermoplastic resin composition according to claim 1, wherein the thermoplastic resin composition has a haze of about 10% or less and a total light transmittance of about 80% or more, as measured on a 2.5 mm thick specimen in accordance with ASTM D1003.

9. The thermoplastic resin composition according to claim 1, wherein the thermoplastic resin composition has a surface resistance of about $10 \times 10^8 \Omega/\square$ or less, as measured on a 2.5 mm thick specimen at 23° C. and 50% RH in accordance with ASTM D250.

10. The thermoplastic resin composition according to claim 1, wherein the thermoplastic resin composition satisfies Equation 3:

1000 mm≤$Id$     [Equation 3]

where Id is a drop height measured on a 2 mm thick injection-molded specimen using a 1 kg metallic weight according to the DuPont drop test method.

11. A molded article produced from the thermoplastic resin composition according to claim 1.

* * * * *